Nov. 10, 1959   R. W. MASON ET AL   2,912,311
APPARATUS FOR PRODUCTION OF HIGH PURITY ELEMENTAL SILICON
Filed Nov. 20, 1957   2 Sheets-Sheet 2
FIG.2.
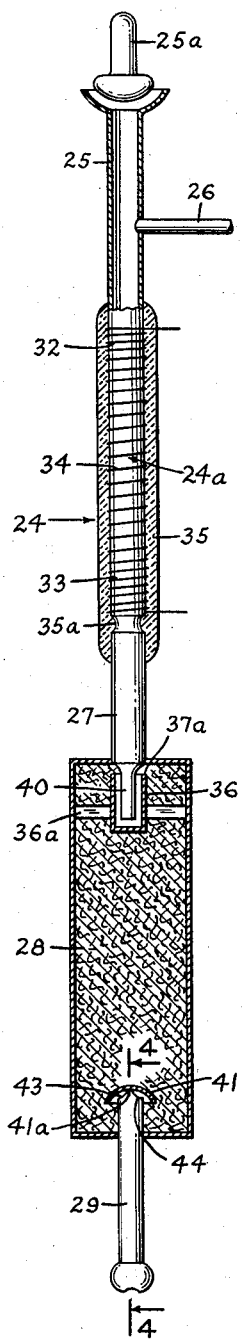
FIG.4.
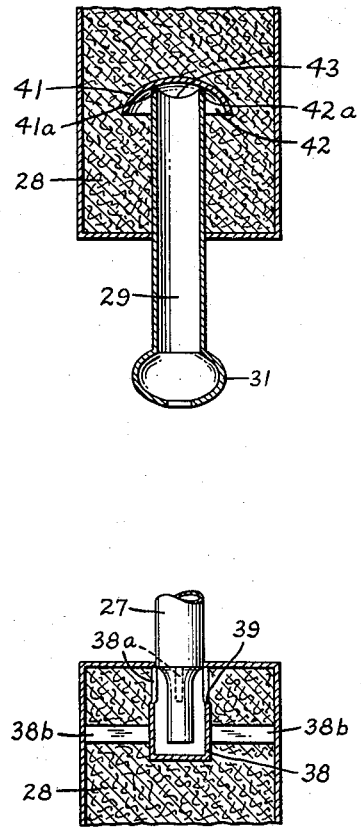
FIG.3.
INVENTORS
ROBERT W. MASON
ANTHONY W. YODIS
BY
*Roger J. Drew*
ATTORNEY

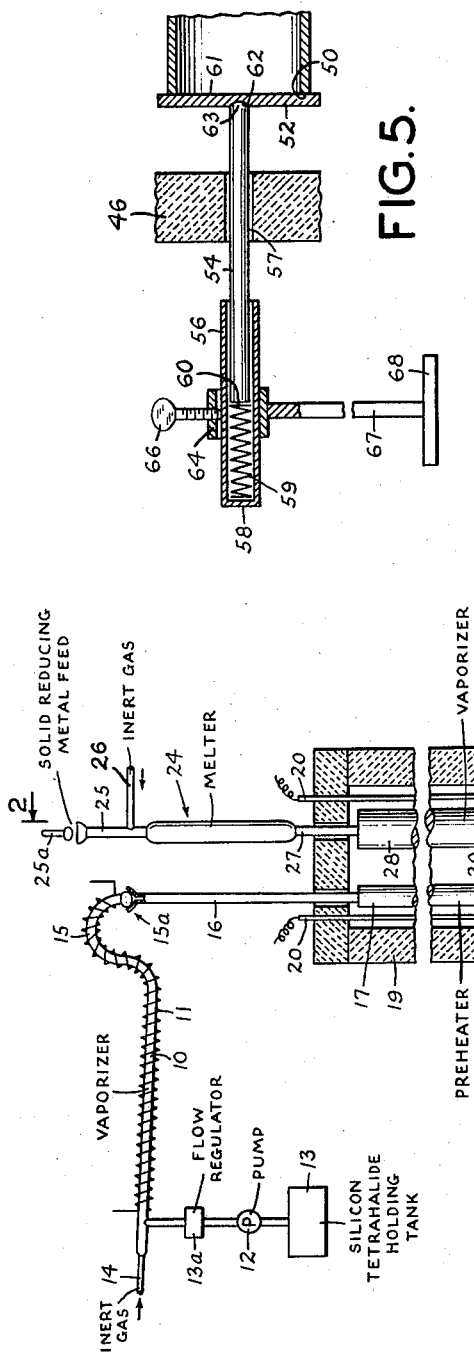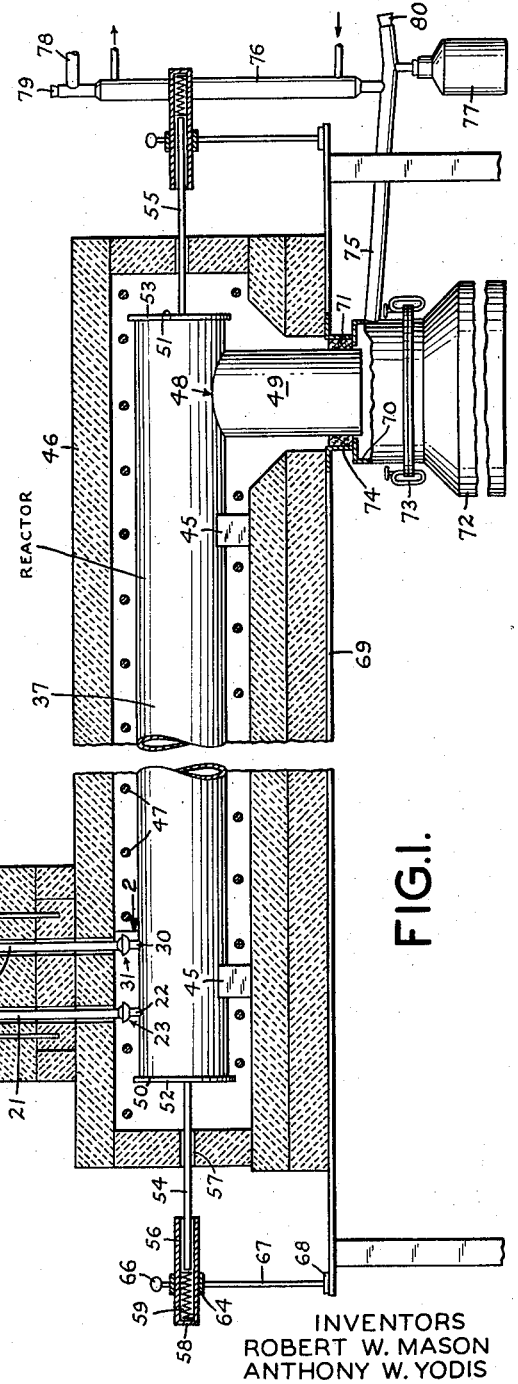

United States Patent Office 2,912,311
Patented Nov. 10, 1959

2,912,311

APPARATUS FOR PRODUCTION OF HIGH PURITY ELEMENTAL SILICON

Robert W. Mason, Morris Plains, and Anthony W. Yodis, Whippany, N.J., assignors to Allied Chemical Corporation, a corporation of New York Application November 20, 1957, Serial No. 697,621

8 Claims. (Cl. 23—277)

This invention relates to apparatus for production of high purity, elemental silicon.

Elemental silicon of high purity has been produced in the past by a process involving separately vaporizing a reducing metal, such as zinc, and a tetrahalide of silicon, such as the tetrachloride, by heating these materials in separate, silica boiler flasks communicating with a tubular silica reactor by silica ducts or conduits, and then combining the resulting vapor streams (each stream being at substantial reaction temperature) in the reactor and reacting the same therein. High purity crystalline silicon is formed and deposited in the reactor while vaporous by-product reducing metal halide and any unconsumed reactants are simultaneously withdrawn therefrom. The reducing metal could be melted prior to vaporization either in silica crucibles housed in a heating furnace or in the boiler flask itself.

Use of the silica boiler flask previously mentioned for supply of zinc vapor to the reactor has proven to be disadvantageous. In the first place it has been found very difficult, when using the boiler flask, to control the supply of zinc vapor to the reactor in accordance with the substantial or approximate stoichiometric requirements for the reaction with silicon tetrachloride. The silica boiler flask and molten zinc therein visually have the same degree of redness or red heat during the boiling or vaporizing and, because everything looks red, it is virtually impossible to determine the metal level in the flask at any given time. Consequently, it is not known with accuracy when to add more reducing metal to the boiler flask for vaporization and, as a result, all of the metal may occasionally boil from the flask unknown to the operator resulting in cessation of vapor supply to the reactor. If heat is withdrawn from the flask to enable the metal level to be determined, vapor supply to the reactor is cut off. Also when molten or solid zinc is added to the zinc being vaporized in the flask, the vaporization rate is either temporarily considerably diminished or stopped completely. These erratic and nonuniform reducing metal vaporization and vapor feed rates to the reactor result in an inefficient, wasteful and uneconomical process entirely unsatisfactory for a commercial or continuous set up.

The prior art boiler flasks have also proven disadvantageous because, on withdrawal of heat from the flask during a shutdown or for some other reason, the flask frequently cracks due to solidification of residual reducing metal therein. This breakage results in increased operating expense.

It is therefore an object of this invention to provide improved apparatus for production of high purity, elemental silicon by the vapor phase reaction of a silicon tetrahalide, e.g. silicon tetrachloride, and a vaporized reducing metal, e.g. zinc, which apparatus will overcome the previously discussed disadvantages of the prior art apparatus. Another object is to provide an improved apparatus for production of high purity elemental silicon characterized by an improved reducing metal vapor feed system which provides good control of supply of vaporized reducing metal, e.g. zinc, to the reactor in accordance with the approximate stoichiometric requirement for reaction with the tetrahalide of silicon, e.g. the tetrachloride thereof. A further object is to provide an improved apparatus particularly adapted for use in a continuous process for production of high purity, elemental silicon. Additional objects and advantages will be apparent as the invention is hereinafter described in more detail.

The apparatus of this invention, in its broader aspects, comprises a closed reactor or reaction vessel provided with separate inlets for silicon tetrahalide and reducing metal vapor and a separate outlet for vapor phase reaction by-products; means for heating externally the walls of the reactor; means for supplying silicon tetrachloride vapor to the reactor inlet therefor; means for supplying reducing metal vapor to the reactor inlet therefor comprising juxtaposed, separate externally heated vessels interconnected by a conduit for respectively melting the reducing metal and vaporizing the molten metal, the melting vessel providing at its upper end an inlet for solid reducing metal, means associated with the melting vessel inlet for supplying inert gas to the melting vessel; means within the melting vessel for retaining unmelted reducing metal therewithin while permitting flow of molten reducing metal through the conduit and into the vaporizing vessel, the vaporizing vessel containing packing material having extended surfaces to effect distribution of the molten metal thereover as a film during its vaporization, and a reducing metal vapor feed conduit interconnecting the vaporizing vessel and the inlet for metal vapor to the reaction vessel.

More specifically, with reference to the improved reducing metal vapor feed system which comprises the combination of the tubular melter and tubular vaporizer as is hereinafter described in detail, this feed system is a considerable improvement over the prior art reducing metal vapor feed system previously discussed involving use of silica boiler flasks. The instant feed system provides an efficient, trouble-free system capable of providing excellent direct visual control of supply of reducing metal vapors at a relatively uniform or constant rate to the reactor, in accordance with the approximate stoichiometric requirements for reaction with vaporized silicon tetrahalide. The melting vessel comprises a vertically disposed, tubular vessel of considerable length which may be disposed in a muffle heater, or encompassed by an electrical resistance heating coil preferably having a greater number of windings in the upper and lower portions thereof than in its intermediate portion, to provide uniform heating and compensate for heat losses at the vessel ends. Employment of the heating coil having a greater number of windings in the upper and lower portions thereof than in its central or intermediate portion provides as well greater heat input where desired to preheat rapidly the solid metal charge.

The molten reducing metal is conducted as melted by gravity flow from the tubular melting vessel to the vaporizer, which has packing material therein maintained at vaporizing temperature of the metal. The packing material has extensive surface area or extended surfaces over which the molten metal is distributed as a film during its vaporization, whereby vaporization is facilitated. The vaporizer preferably has means providing an open-top distributing receptacle or cup disposed within the vaporizer adjacent to the upper end thereof for receiving molten reducing metal from a conduit leading from the melting vessel, maintaining a pool thereof of substantial depth, and permitting flow of molten metal over its side wall for distribution onto the heated packing material to be vaporized. The molten reducing metal feed conduit from the melting vessel preferably terminates within this cup or open-top receptacle at a level thereof beneath the surface of the metal pool, whereby a liquid seal is provided which prevents passage of generated vapors from the vaporizer into this molten reducing metal feed conduit. The reducing metal vapor feed conduit leading from the vaporizer to the reducing metal vapor inlet of the reaction vessel preferably extends upwardly a substantial distance in the vaporizer, and has a baffle disposed over its upper end or vapor inlet for preventing liquid metal from passing therein with metal vapors.

The instant apparatus is preferably constructed or fabricated of silica, excepting of course the electrical resistance heating coils which are preferably of Nichrome, the silicon tetrahalide supply pump preferably of material marketed under the trademark name "Teflon," the heating furnace walls of insulating brick, the by-product collector vessel preferably of stainless steel, and certain other elements and equipment neither contacting reactant materials prior to reaction nor contacting the product silicon. It has been found that silica fabricated equipment is preferred for production of the extremely pure silicon which is of great value as a semiconductor in transistors, diodes and other devices used in high frequency circuits. However, other materials such as magnesium oxide, zinc oxide, carbon, boron and beryllium oxide can be utilized for the reactor wall surfaces in some instances.

Zinc is a preferred reducing agent herein for production of silicon of the high degree of purity specifically mentioned above because it is readily available and capable of purification with ease. Cadmium can also be employed. Although silicon tetrachloride is the preferred halide to be reduced, the silicon bromide could be used, if desired.

Reference is now made to the accompanying drawings wherein:

Fig. 1 is a side elevational view partially in section of one form of the apparatus of this invention.

Fig. 2 is an elevational view partially in section taken along line 2—2 of Fig. 1 of the reducing metal vapor feed system of the instant invention.

Fig. 3 shows a modified form of the open-top receptacle of the reducing metal vaporizer shown in Fig. 2.

Fig. 4 is an enlarged detail sectional view of the lower portion of the reducing metal vaporizer, taken along line 4—4 of Fig. 2.

Fig. 5 is a vertical enlarged sectional elevational view of an end closure for the reaction vessel.

In accordance with Fig. 1, silica vaporizer tube 10 for vaporizing silicon tetrahalide such as the tetrachloride is encompassed by Nichrome electrical resistance heating coil 11. This vaporizer tube typically may have a ratio of length to internal diameter of from 10:1 to 50:⅜ respectively. Pump 12 is provided for continuously supplying liquid silicon tetrahalide at a controlled rate to vaporizer tube 10 from holding tank 13 by way of conventional flow regulator or meter 13a. Inert gas supply conduit 14 of silica is joined to the end of this vaporizer tube and upward bend 15 is provided at the opposite end thereof to prevent liquid tetrahalide from exiting with tetrahalide vapors. The vaporizer tube is joined to silica conduit 16 through ball and socket joint indicated generally at 15a. Conduit 16 is an integral, upward extension of tubular tetrachloride vapor preheater 17.

The preheater 17 is made of silica, packed with thin wall silica Raschig rings and housed in heating furnace 19 having walls of insulating brick. The preheater typically may have a ratio of height to internal diameter of from 24:½ to 8:2 respectively. Furnace 19 is provided with electrical heating elements 20 for supplying heat thereto. If desired, heat could be supplied for the furnace by gas firing, e.g. with coke oven gas. Silica conduit 21 is an integral downward extension of preheater 17 leading to vapor inlet 22 of the reaction vessel 37, being joined to this inlet by ball and socket joint shown generally at 23.

Tubular zinc melting vessel 24, which is unobstructed or empty except for means hereinafter described in its lower portion for retaining unmelted reducing metal therein and which is fabricated of silica, is encompassed by electrical resistance heating coil 24a, shown in Fig. 2, of resistance wire such as Nichrome wire for imparting heat thereto. Conduit 25 of silica, which is integral with melting vessel 24 and an upward extension thereof, is provided for supplying reducing metal, e.g. zinc, bars to the melting vessel at a controlled rate, the inlet to this conduit being closable by stopper 25a, or by a suitable valve. Inert gas, e.g. argon or hydrogen, supply conduit 26, also of silica, is joined to conduit 25 a short distance above the melting vessel. Silica conduit 27, which is integral with melting vessel 24 and a downward extension thereof, connects the same with the upper portion of silica tubular flash vaporizer 28 packed with silica Raschig rings. A silica conduit 29 interconnects the bottom portion of the flash vaporizer with zinc vapor inlet 30 of the reaction vessel, being joined to this inlet through ball and socket joint indicated generally at 31. The flash vaporizer is also housed in heating furnace 19 previously mentioned.

With reference to Fig. 2 which shows in greater detail the melting vessel and flash vaporizer, electric resistance heating coil 24a has a relatively greater number of windings in its upper and lower one-third portions 32 and 33 respectively, than in its intermediate or central portion 34 for imparting relatively greater quantities of heat to the upper and lower one-third portions of the melting vessel. A typical distribution of windings or turns in the upper portion of the heating coil is 15, in the intermediate or central portion 8, and in the lower portion 18. Insulating material 35 surrounds the heating coil and melting vessel. Constriction or neck 35a within the lower portion of the melting vessel serves to retain bars or other solid metal in the melter until melted. Alternatively, constriction 35a may be supplemented or substituted by a suitable screen extending across the lower end of the melter. A screen is particularly desirable if the available metal is in granular form. Tubular melter 24 typically may have a ratio of height to internal diameter of from 6:⅜ to 18:¾ respectively.

Flash vaporizer 28 has a trap or liquid seal against passage of metal vapors into conduit 27 formed in part by a molten metal pool resulting from molten metal discharged from conduit 27 into silica cup or open-top receptacle 36. The cup or receptacle is disposed within vaporizer 28 adjacent its upper end by supporting means 36a. Conduit 27 has a downwardly tapered portion 40 within the open-top receptacle terminating at a level thereof beneath the surface of the metal pool therein to provide the liquid seal. Molten metal overflows the top 37a of this receptacle and is distributed as a film onto heated packing of the vaporizer to be flash vaporized. Also, receptacle 36 serves to retain until melted occasional small pieces of metal which pass through the screen or other retaining means in the melter. If desired, as shown in greater detail in Fig. 3, an open-top receptacle 38 having a generally cylindrical side wall having a plurality of vertical slotted openings 38a equi-spaced therein and extending from its top downwardly to close to but above its mid level can be substituted for receptacle 36 and supported in the vaporizer by supporting means 38b. Molten metal will flow over the bottom edge 39 of each slot onto the heated packing for vaporization. The cup 36 typically has a ratio of height or depth to internal diameter of from 1:1 to 2:½ respectively.

Conduit 29 extends upwardly a suitable distance within the flash vaporizer and has curved silica baffle 41 over its upper end or vapor inlet. Conveniently, as shown, the baffle can be an inverted cap spot welded to conduit 29 at point 41a and 42a. Scallops or large serrations 43 and 44 in the upper end of conduit 29 beneath the baffle provide inlet openings for passage of metal vapors thereinto. Alternatively, conduit 29 may have a plurality of orifices or perforations in its upper side wall beneath the baffle for withdrawal of metal vapors therethrough. Tubular flash vaporizer 28 typically may have a ratio of height to internal diameter of from 24:1 to 9:3 respectively.

Referring again to Fig. 1, tubular reactor 37 rests on supports 45 within main heating furnace 46, the furnace walls being constructed of insulating brick. This furnace is supported on steel table 69 and is equipped with a plurality of spaced electrical heating elements 47 for supply of heat to the reactor walls.

Reactor 37 has quartz or silica walls and is provided with zinc vapor inlet 30 and silicon tetrachloride vapor inlet 22. The reactor typically may have a length of from 3 to 8 feet and an internal diameter of from 4 to 12 inches. The reaction vessel is also provided with vapor outlet 48, which is remote from the reactant vapor inlets, for vaporized by-product metal halide and any unconsumed reactants. Silica conduit 49 extends downwardly from outlet 48 for withdrawal of by-product zinc chloride and any unconsumed reactant material vapor from the reaction vessel. If desired, a suitable mild suction or vacuum producing device such as a suction pump can be connected to conduit 49 to aid in withdrawal of vaporized by-products including unconsumed reactants from the reaction vessel. The reaction vessel has flat ground wall edges 50 and 51 at each end thereof.

Silica closure plates 52 and 53 are removably mounted at each end of the reactor perpendicular to the axis thereof to vapor or gas tightly close off the same. If desired, only one closure plate may be employed, the opposite reactor end being integral. The closure plates are forced against the reactor ends by spring urged rods 54 and 55. These removable plates constitute improvement over the prior art reactor tube having integral ends because access may now be had to the reaction chamber and product silicon therein with relative ease, simply by removing the plate or plates from the reactor end or ends. Formerly the reactor ends were integral with the reactor and product removal was effected through the by-product vapor outlet, a procedure necessitating disconnection of the by-product collector vessel from the reactor and a time consuming and expensive job since the silica breakage rate was high.

As shown in greater detail in Fig. 5, the closure rod 54 is telescopically disposed in pipe housing 56 and extends outwardly therefrom in a generally horizontal direction, and extends through aperture or opening 57 in the end wall of heating furnace 46. The opposite end 58 of the housing is closed. Coil spring 59, preferably of steel, is located in pipe housing 56 with one end bearing against its closed end and the other end 60 bearing against the closure rod to yieldingly force the same against closure plate 52. The closure plate is thereby forced against wall edge 50 at the reactor's open end to seal or close off the same. Closure plate 52 preferably has a flat ground surface 61 which cooperates with flat ground wall 50 of the reactor to gas tightly close or seal off the reactor end. The opposite surface has a concave depression 62 within which the convex end 63 of the closure rod fits for receiving and retaining this end in non-slipping fashion. The pipe housing 56 is located between clamp 64 provided with thumb screw 66. Clamp 64 is affixed to standard 67 mounted on base 68 and, when thumb screw 66 is tightened, the pipe housing is immovable. When this thumb screw is loosened, the pipe housing and closure rod can be moved in a direction generally horizontally away from the closure plate 52 to permit removal of the same. The closure plate 53, closure rod 55 and the remaining closure plate mounting device at the opposite end of the reactor, as shown in Fig. 1, is substantially identical to that described.

By-product exit conduit 49 is gas tightly joined at its lower end portion to stainless steel annular member 70 with the aid of asbestos packing ring 71, to insure absence of obnoxious fumes and relative movement between reactor and collector vessel. The annular member is in turn joined at its lower end to the top of stainless steel collector vessel or receptacle 72 with the aid of clamp 73. By-product zinc chloride and any unconsumed zinc are collected in vessel 72. Steel flange member 74 is integral with the top of annular member 70 and is welded to table 69 to provide support for the collector vessel. Conduit 75 communicates the space enclosed by annular member 70 with water cooled condenser 76 which condenses any unreacted silicon tetrachloride. Receptacle 77 collects any condensed tetrachloride and vent 78 enables discharge of any lower halides of silicon or other light by-products passing over. Stoppers 79 and 80 close off the condenser top and end of conduit 75 respectively.

Prior to start up, the apparatus is preferably flushed for 4 hours with argon introduced through supply conduits 14 and 26. The argon has been first purified by passage over a titanium bed at a temperature of 1000° C. The apparatus is then heated typically to the following temperatures: tubular reaction vessel, 950–975° C.; flash vaporizer, 1100° C. and preheater 1100° C. Heating coils 24a and 11 of zinc melting vessel 24 and silicon tetrahalide vaporizer 10 are connected to a suitable current supply regulated to provide supply of molten zinc to vaporizer 28, and supply of tetrahalide vapor to preheater 17 at rates such that approximate stoichiometric amounts of vapors thereof will be supplied to reactor 37 for their reaction. Melting vessel 24 and tetrahalide vaporizer 10 are heated typically to temperatures of approximately 700° C. and 150° C. respectively. While maintaining a seal of inert gas in conduit 25, zinc bars of about 99.999% purity, having length of 9½" and diameter of ⅜" are fed to melting vessel 24, through conduit 25 periodically or at a rate to maintain a supply of unmelted zinc in the melter. Each zinc bar melts as it passes or gravitates downwardly through the melter and the resulting molten metal is conducted to flash vaporizer 28 through conduit 27. The molten zinc is received in open-top receptacle 36 in a pool of considerable depth therein and flows over the top of the receptacle side wall and onto the heated Raschig ring packing where it is flash vaporized.

During continuous typical operation of the apparatus of this invention over an approximate 28 hour period, a zinc bar having length of 9½", diameter of ⅜", and weight of 122.2 grams was fed about each 8.1 minutes to a vertical, silica, tubular melter having a height of 10", an internal diameter of ½", and a neck diameter of ¼" electrically heated to melt the zinc at the rate of 905 grams/hour. The molten zinc flowed continuously downwardly from the melter by gravity flow and through a silica conduit to a vertical, silica, vaporizer tube 12" in height and 2" in internal diameter. This vaporizer tube was packed with silica Raschig rings and housed with a silicon tetrachloride preheater tube in an electrically heated muffle maintained at 1075° C. to 1125° C. The molten zinc was received beneath the surface of a molten zinc pool in a silica cup 1½" deep and ⅝" in internal diameter located adjacent the top of the vaporizer. It flowed out of the cup onto the hot packing material through equispaced vertical slots typically about ¹⁄₁₆" in width in the cup's side wall and extending from its top about ½" downwardly in its side wall, the slots being spaced typically about ⁵⁄₁₆" apart. The molten zinc was distributed over the hot packing material as a film during the vaporization, and generated zinc vapors were continuously withdrawn from the vaporizer through a silica conduit intersecting the vaporizer bottom and extending upwardly 2" into the vaporizer. A silica baffle spot welded to this conduit at two points on opposite sides of the upper end thereof prevented any liquid zinc from being withdrawn with the vapors. The zinc vapors were continuously supplied to the zinc vapor inlet of a horizontal, silica reactor tube having length of 78" and internal diameter of 5", and having a silica closure plate removably mounted at each end thereof. The reactor tube was housed in a second electrically heated muffle or furnace. The walls of the reactor tube were maintained at temperatures between 950° C. and 975° C.

Silicon tetrachloride was simultaneously and continuously pumped to an electrically heated silica vaporizer tube 30" in length and 5/8" in internal diameter, after the molten zinc first entered the vaporizer, at a rate of about 1176 grams/hour. Generated vapors of silicon tetrachloride were conducted therefrom downwardly through a silica conduit to a silica preheater tube 12" in height and 1" in internal diameter, where they were preheated to substantial reaction temperature of 900°–925° C. The preheated tetrachloride vapors were continuously passed downwardly through a silica conduit to the silicon tetrachloride vapor inlet of the tubular reactor previously mentioned. Reaction occurred within the reactor between the silicon tetrachloride vapors and zinc vapors and elemental silicon precipitated in the reactor. The vaporous by-products composed of zinc chloride vapors and unconsumed zinc and silicon tetrachloride vapors were continuously withdrawn from the reactor through a vapor outlet located in close proximity to the reactor end opposite the end adjacent which the reactant vapor inlets are located. By-product zinc chloride and unreacted zinc were collected in a stainless steel receptacle gas tightly joined to the vapor outlet, and unreacted silicon tetrachloride vapors were liquefied in a water cooled condenser and collected in a stainless steel receptacle.

At the end of the operating period, the closure plate at the reactor end adjacent the zinc and tetrachloride vapor inlets was removed and silicon product was withdrawn from the reactor with a silica rake. The product silicon was capable of being processed in known or desired manner to produce a monocrystalline material of value for use in transistors and diodes.

The melter was empty at the end of the run, and none of the equipment was cracked or broken. As evidenced by the foregoing example, the instant reducing metal vapor feed system provides efficient, trouble-free, direct control over supply of reducing metal vapors to the reactor. By virtue of simply adding solid reducing metal to the melter at a predetermined rate, in the foregoing example one bar about every 8.1 minutes, molten zinc is continuously passed to the vaporizer at substantially constant rate and the vapors generated therein are continuously supplied to the reactor.

We claim:

1. Apparatus for production of high purity silicon by reaction in vapor phase between a silicon tetrahalide and a reducing metal comprising a reaction vessel provided with separate inlets for silicon tetrahalide and reducing metal vapor and a separate outlet for vapor phase reaction by-products; means for heating externally the walls of said vessel; means for supplying silicon tetrahalide vapor to the reaction vessel inlet therefor; means for supplying reducing metal vapor to the reaction vessel inlet therefor comprising juxtaposed, separate, externally heated tubular vessels interconnected by a conduit for respectively melting said reducing metal and vaporizing the molten metal, the melting vessel providing at its upper end an inlet for solid reducing metal; means associated with said melting vessel inlet for supplying inert gas to said melting vessel; means within said melting vessel for retaining unmelted reducing metal therewithin while permitting flow of molten reducing metal through said conduit and into the vaporizing vessel, said vaporizing vessel containing packing material having extended surfaces to effect distribution of the molten metal thereover as a film during its vaporization; and a reducing metal vapor feed conduit interconnecting said vaporizing vessel and said inlet for metal vapor to said reaction vessel.

2. Apparatus for production of high purity silicon by reaction in vapor phase between a silicon tetrahalide and a reducing metal comprising a reaction vessel provided with separate inlets for silicon tetrahalide and reducing metal vapor and a separate outlet for vapor phase reaction by-products; means for heating externally the walls of said vessel; means for supplying silicon tetrahalide vapor to the reaction vessel inlet therefor; means for supplying reducing metal vapor to the reaction vessel inlet therefor comprising juxtaposed, separate, externally heated tubular vessels interconnected by a conduit for respectively melting said reducing metal and vaporizing the molten metal, the melting vessel providing at its upper end an inlet for solid reducing metal and within the lower portion thereof means for retaining unmelted metal therewithin while permitting flow of molten metal through said conduit and into the vaporizing vessel; means associated with said melting vessel inlet for supplying inert sealing gas to said melting vessel, said vaporizing vessel containing packing material having extended surfaces to effect distribution of molten metal thereover as a film during its vaporization; a distributing cup for molten reducing metal disposed within said vaporizing vessel adjacent the upper end thereof and within said packing material, the aforesaid conduit extending downwardly into said cup; a metal vapor feed conduit interconnecting said vaporizing vessel and said inlet for metal vapor to said reaction vessel and extending upwardly into said vaporizing vessel; and a baffle over the upper end of said vapor feed conduit for preventing flow of molten metal thereinto.

3. Apparatus for production of high purity silicon by vapor phase reaction of a silicon tetrahalide and a reducing metal, which comprises a closed reaction vessel provided with a silicon tetrahalide vapor inlet, a reducing metal vapor inlet spaced from said tetrahalide inlet, and an outlet for vapor phase reaction by-products located in a region thereof remote from said inlets; means for heating externally and maintaining the reaction vessel walls at a temperature above the dew point of the by-products; a vertical, externally heated, tubular melting vessel for receiving and melting solid reducing metal provided with an upper inlet for solid metal and a lower outlet for molten metal; means within said melting vessel for retaining unmelted reducing metal therewithin while permitting flow of molten reducing metal through said outlet; means associated with said melting vessel inlet for supplying inert gas thereto; a vertical, tubular, externally heated vaporizer for vaporizing molten reducing metal disposed below said melting vessel, said metal vaporizer containing packing material having extended surfaces to effect distribution of the molten metal thereover as a film during its vaporization; a molten reducing metal feed conduit interconnecting the melting vessel outlet and the packed vaporizer; a metal vapor feed conduit interconnecting said reducing metal vaporizer and the reducing metal vapor inlet of said reaction vessel; means for vaporizing liquid silicon tetrahalide; means for feeding liquid silicon tetrahalide to said tetrahalide vaporizing means; means connected to the tetrahalide vaporizing means for preheating the silicon tetrahalide vapor to a substantial reaction temperature; and a tetrahalide vapor feed conduit interconnecting said preheating means and said tetrahalide vapor inlet of the reaction vessel.

4. Apparatus for production of high purity silicon by vapor phase reaction of a silicon tetrahalide and a reducing metal which comprises, as a closed system, a tubular reaction vessel provided with a silicon tetrahalide vapor inlet, a reducing metal vapor inlet spaced from said tetrahalide inlet, and an outlet for vapor phase reaction by-products located in a region thereof remote from said inlets; means external of the reaction vessel for heating and maintaining the reaction vessel walls at a temperature above the dew point of the by-products; a vertical, tubular melting vessel for receiving and melting solid reducing metal pieces, the melting vessel being provided with an upper inlet for said solid metal and a lower outlet for molten metal; means within said melting vessel adjacent said outlet for retaining unmelted reducing metal therein while permitting flow of molten reducing metal through said outlet; means external of the melting vessel for heating the same; means associated with said melting vessel inlet for supplying inert gas to said melting vessel; a vertical, tubular, vaporizer for vaporizing molten reducing metal disposed below said melting vessel, said metal vaporizer containing packing material having extensive surface area to effect distribution of molten metal thereover as a film during its vaporization; means external of the vaporizer for heating and maintaining the vaporizer packing at a temperature sufficiently high to vaporize molten reducing metal contacting the same; means providing a distributing cup for molten reducing metal disposed within said reducing metal vaporizer adjacent the upper end thereof and within said packing material; a molten reducing metal feed conduit leading from the melting vessel outlet and extending downwardly into said cup; a reducing metal vapor feed conduit interconnecting said reducing metal vaporizer and the reducing metal vapor inlet of said reaction vessel and extending upwardly into said metal vaporizer, said metal vapor feed conduit having a baffle over its upper end in said metal vaporizer for preventing flow of molten metal thereinto; means for vaporizing liquid silicon tetrahalide; means for feeding liquid silicon tetrahalide to said tetrahalide vaporizing means; means connected to the tetrahalide vaporizing means for preheating the silicon tetrahalide vapor to a substantial reaction temperature; and a tetrahalide vapor feed conduit interconnecting said preheating means and said tetrahalide vapor inlet of the reaction vessel.

5. Apparatus for production of high purity silicon by vapor phase reaction of silicon tetrachloride and zinc which comprises, as a closed system, a tubular reaction vessel provided with a silicon tetrachloride vapor inlet, a zinc vapor inlet spaced from said tetrachloride inlet, and an outlet for vapor phase reaction by-products located in a region thereof remote from said inlets; means external of the reaction vessel for heating and maintaining the reaction vessel walls at a temperature above the dew point of the by-products; a vertical, tubular melting vessel for receiving and melting solid zinc pieces provided with an upper inlet for the solid zinc and a lower outlet for molten zinc, said melting vessel being encompassed by an electrical resistance heating coil having a relatively greater number of windings in the upper and lower portions thereof than in its intermediate portion to provide uniform heating and compensate for heat losses at the melting vessel ends; means within the lower portion of said melting vessel adjacent said outlet for retaining unmelted zinc therein while permitting flow of molten zinc through said outlet; means associated with said melting vessel inlet for supplying inert gas to said melting vessel; a vertical, tubular, packed vaporizer for vaporizing molten zinc disposed below said melting vessel, said zinc vaporizer containing packing material having extensive surface area to effect distribution of molten zinc thereover as a film during its vaporization; means external of the vaporizer for heating and maintaining the vaporizer packing at a temperature sufficiently high to vaporize molten zinc contacting the same; an open-top receptacle disposed within said zinc vaporizer adjacent the upper end thereof for receiving molten zinc from a molten zinc feed conduit hereinafter described whereby a molten zinc pool is maintained in said receptacle and molten zinc flows over its side wall onto the heating packing to be vaporized, said open-top receptacle being of relatively smaller diameter than said zinc vaporizer, said molten zinc feed conduit leading from the melting vessel outlet and terminating within said receptacle at a level thereof beneath the surface of the zinc pool to provide a liquid seal; a zinc vapor feed conduit interconnecting said zinc vaporizer and the zinc vapor inlet of said reaction vessel and extending upwardly a substantial distance into said vaporizing vessel, said vapor feed conduit having a baffle over its upper end in the zinc vaporizer for preventing flow of molten metal thereinto; a tubular generally horizontal vaporizer for vaporizing liquid silicon tetrachloride, said tetrachloride vaporizer having an upward bend in its vapor outlet end for retaining liquid tetrachloride therein until vaporized and being encompassed by an electrical resistance heating coil for imparting heat thereto; means for feeding liquid silicon tetrachloride to an inlet end of said tetrachloride vaporizer opposite its vapor outlet end; means associated with the tetrachloride inlet end of said tetrachloride vaporizer for supplying inert gas thereto; a vertical tubular, packed preheater for preheating the tetrachloride vapors to a substantial reaction temperature; means external of the preheater for heating the packing thereof; a tetrachloride vapor feed conduit interconnecting the tetrachloride vaporizer outlet end and the upper end of said preheater, and a preheated tetrachloride vapor feed conduit interconnecting the lower end of said preheater and said tetrachloride vapor inlet of the reaction vessel, said apparatus being fabricated of silica excepting the electrical resistance heating coils.

6. Apparatus for production of high purity, crystalline silicon by vapor phase reaction of silicon tetrachloride and zinc which comprises, as a closed system, a tubular reactor provided with a silicon tetrachloride vapor inlet, a zinc vapor inlet spaced adjacent said tetrachloride inlet, and an outlet for vapor phase reaction by-products located in a region thereof remote from said inlets; a closure plate removably mounted at an end of said reactor perpendicular to the axis thereof to gas tightly close said end, said reactor end being open and providing access to within the reactor when the closure plate is removed therefrom; means external of the reactor for heating and maintaining its walls at a temperature above the dew point of the by-products; a vertical, tubular melting vessel for receiving and melting zinc bars, the melting vessel being provided with an upper inlet for said zinc bars and a lower outlet for molten zinc, said melting vessel being encompassed by an electrical resistance heating coil having a relatively greater number of windings in the upper and lower portions thereof than in its intermediate portion to provide uniform heating and compensate for heat losses at the melting vessel ends; means within the lower portion of the melting vessel for retaining unmelted zinc therein while permitting flow of molten zinc through said outlet; means associated with said melting vessel inlet for supplying inert gas to said melting vessel; a vertical, tubular vaporizer for vaporizing molten zinc disposed below said melting vessel, said zinc vaporizer containing packing material having extensive surface area to effect distribution of molten zinc thereover as a film during its vaporization; means external of the vaporizer for heating and maintaining the vaporizer packing at a temperature sufficiently high to vaporize molten zinc substantially immediately after the molten zinc contacts the heated packing; an open-top receptacle having a generally cylindrical side wall disposed within said zinc vaporizer adjacent the upper end thereof and within said packing material for receiving molten zinc from a molten zinc feed conduit hereinafter described, whereby a molten zinc pool is maintained in said receptacle and molten zinc flows over its side wall onto the heated packing for vaporization as aforesaid, said open-top receptacle being of relatively smaller diameter than said zinc vaporizer, said molten zinc feed conduit leading from the melting vessel outlet and having a downwardly tapered end portion extending into the receptacle and terminating therein at a level thereof beneath the surface of the zinc pool to provide a liquid seal; a zinc vapor feed conduit interconnecting said zinc vaporizer and the zinc vapor inlet of said reaction vessel and extending upwardly a substantial distance into said zinc vaporizer; said zinc vapor feed conduit having a baffle over its upper end in said zinc vaporizer to prevent flow of molten zinc thereinto; a tubular generally horizontal vaporizer for vaporizing liquid silicon tetrachloride, said tetrachloride vaporizer having an upward bend in its vapor outlet end for retaining liquid tetrachloride therein until vaporized and being encompassed by an electrical resistance heating coil for imparting heat thereto; means for feeding liquid silicon tetrachloride to an inlet end of said tetrachloride vaporizer opposite said outlet end thereof; means associated with the tetrachloride inlet end of said tetrachloride vaporizer for supplying inert gas thereto; a vertical, tubular, packed preheater for preheating the silicon tetrachloride vapors to a substantial reaction temperature; means external of the preheater for heating the packing thereof; a tetrachloride vapor feed conduit interconnecting the tetrachloride vaporizer outlet end and the upper end of said preheater; and a preheated tetrachloride vapor feed conduit interconnecting the lower end of said preheater and said tetrachloride vapor inlet of the reaction vessel, said apparatus being fabricated of silica excepting the electrical resistance heating coils.

7. Apparatus of claim 6 wherein the open-top receptacle within the packed zinc vaporizer has a generally cylindrical side wall having a plurality of vertical, equispaced, slotted openings therein extending from its top downwardly to close to but above its mid level, the molten zinc flowing over bottom edges of said slotted openings onto the heated packing material to be vaporized.

8. Apparatus of claim 6 wherein the closure plate is removably mounted at the reactor end to gas tightly close the same by a device comprising a horizontal pipe casing mounted between a clamp affixed to a standard, said casing being spaced from said reactor end and having an open end closer to said reactor end and a closed opposite end, a silica rod telescopically disposed in said casing and projecting therefrom, and a coil spring located in said casing with one end bearing against the closed end and the other end yieldingly urging said rod against the closure plate thereby to force the plate against said reactor end.

References Cited in the file of this patent
UNITED STATES PATENTS
796,338    Maxim _____ Aug. 1, 1905

OTHER REFERENCES

FIAT Final Report 789—Ductile Silicon Release, dated September 13, 1946.

J. of Electrochem, Soc., vol. 96, No. 6, December 1949, pp. 359–363.